United States Patent
Fitch et al.

(10) Patent No.: US 8,672,063 B2
(45) Date of Patent: Mar. 18, 2014

(54) MOTORIZED CHAIN ROLLER

(75) Inventors: Darth Christopher Fitch, Jackson, NJ (US); Christopher Taylor Hill, Point Pleasant, NJ (US)

(73) Assignee: Hilman, Incorporated, Marlboro, NJ (US)

(*) Notice: Subject to any disclaimer, the term of this patent is extended or adjusted under 35 U.S.C. 154(b) by 0 days.

(21) Appl. No.: 13/416,662

(22) Filed: Mar. 9, 2012

(65) Prior Publication Data

US 2013/0233629 A1    Sep. 12, 2013

(51) Int. Cl.
B62D 55/07    (2006.01)

(52) U.S. Cl.
USPC .............. 180/9.1; 180/9.3; 305/193; 305/200

(58) Field of Classification Search
USPC ........... 180/9.1, 9.3, 9.62; 305/193, 194, 195, 305/196, 198, 199, 187, 200, 201, 202
See application file for complete search history.

(56) References Cited

U.S. PATENT DOCUMENTS

| | | | |
|---|---|---|---|
| 2,218,258 A | 10/1940 | Ekbom | |
| 2,373,316 A | 4/1945 | Landy | |
| 2,867,480 A | 10/1957 | Cushman | |
| 3,093,423 A | 6/1963 | Adams | |
| 4,579,182 A | 4/1986 | Dewing et al. | |
| 5,096,270 A * | 3/1992 | Oilund et al. | 305/129 |
| 5,839,802 A * | 11/1998 | Sheets | 305/52 |
| 6,050,355 A | 4/2000 | Beck, Jr. | |
| 6,220,378 B1 * | 4/2001 | Oertley et al. | 180/9.62 |
| 7,976,064 B2 * | 7/2011 | Abdulaev | 280/755 |
| 2010/0096196 A1 * | 4/2010 | VanderVeen | 180/9.1 |

FOREIGN PATENT DOCUMENTS

| | | |
|---|---|---|
| DE | 443 265 C | 4/1927 |
| EP | 56096604 | 6/1981 |
| JP | S-47 11031 | 10/1972 |
| JP | A-58-468 | 1/1983 |

OTHER PUBLICATIONS

Declaration of Christopher T. Hill, Feb. 4, 2013.
Oct. 18, 2013 Search Report issued in European Patent Application No. EP 13157611.8.

* cited by examiner

*Primary Examiner* — Tony Winner
*Assistant Examiner* — Jacob Knutson
(74) *Attorney, Agent, or Firm* — Oliff PLC (57) ABSTRACT

A motorized chain roller includes a frame, a roller chain assembly movably disposed within the frame, a first sprocket that engages the roller chain assembly to apply a transmission force to the roller chain assembly, at least one motor coupled to the frame and configured to transmit a rotational force to the first sprocket, and a load-bearing member coupled to and located within the frame. The roller chain assembly includes a plurality of interconnected cylindrical rolls arranged in a continuous series. Each of the cylindrical rolls has an axis or rotation. The roller chain assembly engages the load-bearing member to cause movement between the roller chain assembly and the load-bearing member perpendicular to the axes of rotation.

20 Claims, 6 Drawing Sheets

MOTORIZED CHAIN ROLLER

FIELD OF THE INVENTION

This invention relates to chain rollers or load skates that are capable of transporting heavy objects, and more particularly to motorized or self-propelled chain rollers or load skates for transporting heavy objects.

BACKGROUND

Heavy objects must be transported in various environments, including manufacturing and repair facilities. However, transporting heavy loads is a difficult and often time consuming undertaking due to the weight of the object(s) and also often due to the bulkiness of the object(s). It is desired to transport such heavy objects as time efficiently as possible, with as little machinery as possible, and as safely as possible. To achieve those goals, it is often desired that the transporter have the lowest possible profile.

Typically, a transporter for heavy objects has a tread assembly including tread segments wrapped around one or more driven gears and a number of stationary axles. The driven gear(s) and the stationary axles define the path of the tread assembly. Only the tread segments contact the ground or floor surface; neither the driven gear(s) nor the stationary rollers contact the ground or floor surface. A significant number of the tread segments contact the ground or floor surface. The tread segments are stationary relative to the ground or floor surface when they engage the ground or floor surface.

A horizontal force in the direction that the transporter is to travel is applied to the transporter or a force is applied to one or more of the gears to rotate the gears in the desired direction. That force causes the transporter to move in the desired direction with the tread segments serially engaging the ground or floor surface. The engagement of the tread segments with the ground or floor surface propels the machine in the desired direction.

Other heavy load transporters include chain roller assemblies that utilize a series of rollers linked together to form the track.

SUMMARY

According to preferred embodiments of the invention, there is provided a motorized chain roller for transporting heavy loads that includes a frame, a roller chain assembly movably disposed with the frame that includes a plurality of interconnected cylindrical rolls arranged in a continuous series, a first sprocket that engages the roller chain assembly to apply a transmission force to the roller chain assembly, a motor coupled to the frame and configured to transmit a rotational force to the first sprocket, and a load-bearing member coupled to and located within the frame. In these embodiments, the roller chain assembly is configured such that the rolls engage the load-bearing member to cause movement between the roller chain assembly and the load-bearing member perpendicular to the axes of rotation.

In some embodiments of the invention, the load-bearing member may be a plate. The rolls may engage one surface of the plate.

In other embodiments, the motorized chain roller may include a second sprocket spaced from the first sprocket. The roller chain assembly may form a loop around the first and second sprockets. The load-bearing member may be located within the loop, between the first and second sprockets. Two motors may be used to transmit a rotational force to the two sprockets. Alternatively, one of the sprockets may be an idler sprocket.

In yet other embodiments of the invention, the roller chain assembly may include a "chain" comprised of a plurality of overlapping links that connect the plurality of rolls to one another. The "chain" may include (1) a first set of links, wherein each link of this first set of links extends between and connects a pair of adjacent rolls (each link is attached to a different pair of rolls) and (2) a second set of links, wherein each link of this second set of links also extends between and connects a pair of adjacent rolls (again, each link is attached to a different pair of rolls). A pair of rolls connected to a link of the first set is never the same as a pair of rolls connected to a link of the second set. That is, a pair of rolls connected to a link of the second set always includes a roll that is also connected to one link of the first set and a roll that is also connected to a second link of the first set. The first sprocket may engage the second set of links to apply transmission force to the roller chain assembly.

In further embodiments of the invention, the cylindrical rolls of the roller chain assembly may be configured to contact the ground, pavement or a floor surface and a bottom surface of the load-bearing member and propel the motorized chain roller when the roller chain assembly moves in its loop. The direction and path of the motorized chain roller may be controlled by a rail, bar, or other elongated member. At least one guide block may be provided that mates with the rail, bar, or other elongated member so that the motorized chain roller moves along a path defined by the rail, bar, or other elongated member. Alternatively, the rail, bar, or other elongated member may be part of a track that is mounted on the ground, pavement or floor surface, such that the motorized chain roller moves along and is supported by the track.

Furthermore, some of the embodiments of the motorized chain rollers of this invention may have two modes of operation. In the first mode, the chain roller assembly rests of the ground, pavement or floor surface and the object to be transported in placed on the motorized chain roller. Movement of the chain roller assembly in its loop causes the motorized chain roller to move in a lateral direction perpendicular to the axes of rotation of the rolls because the rolls simultaneously engage the load-bearing surface and the ground, pavement or a floor surface. In the second orientation, the load-bearing surface of the motorized chain roller is placed on the ground, pavement or floor surface, with the chain roller assembly being exposed upward. The object(s) to be transported is placed on the chain roller assembly. Movement of the chain roller assembly in its loop causes the object(s) to be moved laterally across the top of the motorized chain roller, perpendicular to the axes of rotation of the rolls.

In this manner, this invention provides a motorized chain roller assembly that is compact, is self-sufficient, has a high load carrying capacity and reduces the time and machinery necessary to transport heavy loads.

Other advantages, benefits and features of the present invention will become apparent to those skilled in the art upon reading the detailed description of the invention.

DETAILED DESCRIPTION OF EMBODIMENTS

Referring to the accompanying drawings, motorized chain rollers according to the invention will be described.

Motorized chain roller (MCR) 1 is illustrated in FIGS. 1-7 and includes a frame 3, a load-bearing member 11 attached to the frame 3, motor stacks 9 attached to the frame 3, sprocket assemblies 7 driven by the motors of motor stacks 9 and rotatably supported by the frame 3, a roller chain assembly 5 that engages and forms a loop around the sprocket assemblies 7, and guide block assemblies 33 that are also attached to the frame 3.

I. The Frame

In this embodiment, the frame 3 includes a top load-bearing plate 13, two top cover plates 15, two side plates 17, a front plate 19, a back plate 21 and a tension member 57. See FIGS. 1, 2 and 7. Any combination of plates and other rigid members can be used to form the frame of other embodiments of this invention as long as the members provide the structural strength and integrity to support the heavy loads to be transported and adequately support the roller chain assembly, the sprocket assembly(ies), the motor(s) and the load-bearing member.

The two side plates 17, the front plate 19 and the back plate 21 are connected at their edges to form a basic rectangular frame. The top load-bearing plate 13 and the top cover plates 15 are attached to the top of the rectangular frame formed by the two side plates 17, the front plate 19 and the back plate 21 and enclose the top of that rectangular frame. The side plates 17, the front plate 19, the back plate 21, the top load-bearing plate 13 and the top cover plates 15 may be attached to each other by screws, bolts and nuts, pins or welding, with or without braces.

The side plates 17 are parallel. In this embodiment, each side plate 17 includes apertures 23 and 27 and an indentation 28 (see FIGS. 2 and 7).

As discussed below, the drive shafts 25 of the motor stacks 9 are received through apertures 23 to engage sprocket assemblies 7. Apertures 27 are provided for access to the sprocket assemblies 7 and the roller chain assembly 5. In this embodiment, the aperture 23 in a first of the side walls 17 is opposite the aperture 27 in the other side wall 17. Likewise, the aperture 27 in the first side wall 17 is opposite the aperture 23 in the other side wall 17. In other embodiments, the side walls 17 may not have any apertures 27 or may have additional apertures to access the sprocket assemblies 7 and/or the roller chain assembly 5.

Closing plates 31 are removably attached to side walls 17 to cover apertures 27. The closing plates 31 prevent exposure of the roller chain assembly 5 housed inside the frame 3.

Figure 7:
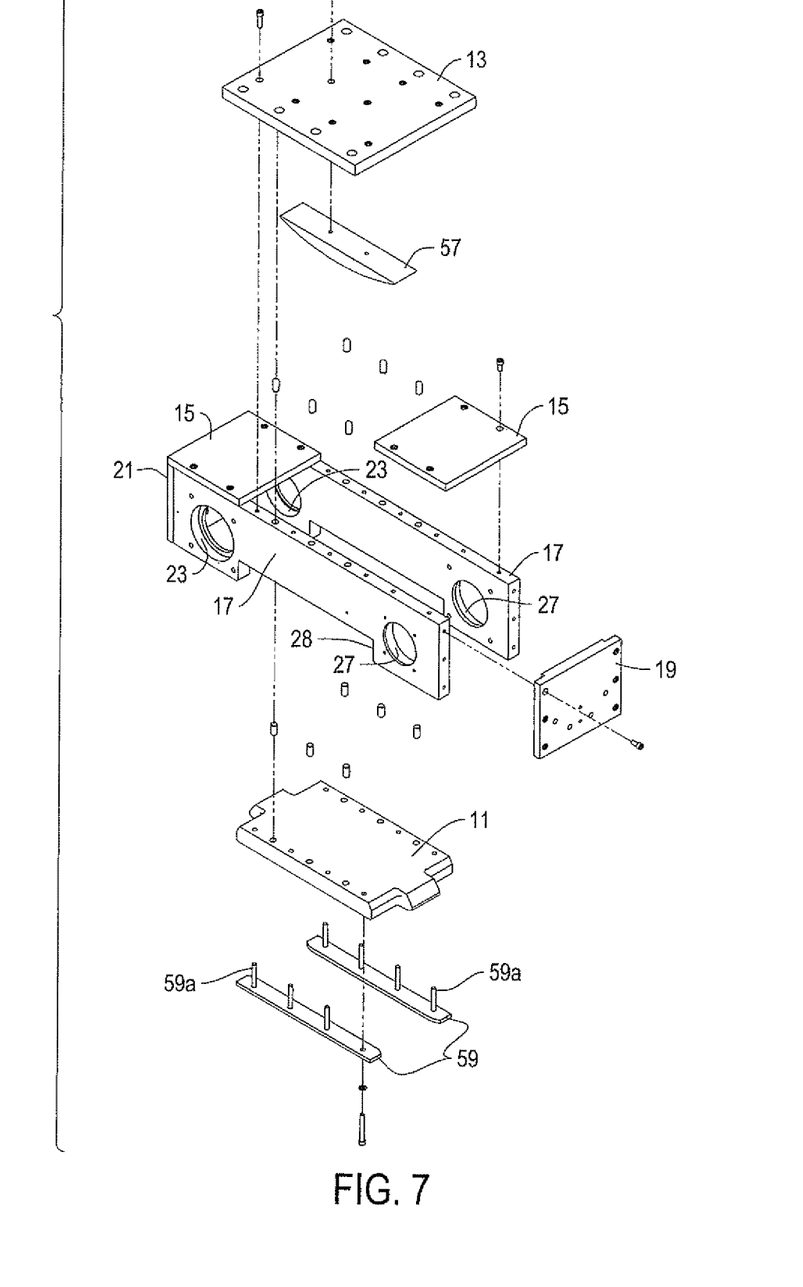
FIG. 7 is an exploded view of the frame and the load-bearing member of the motorized chain roller illustrated in FIGS. 1-6.

The edges of the load-bearing member 11 are received within the indentations 28 of side walls 17, as shown in FIG. 7 and discussed below.

In this embodiment, the top load-bearing plate 13 extends beyond the side walls 17, but does not extend all the way between the front plate 19 and the rear plate 21. Moreover, in this embodiment, the top load-bearing plate 13 has a rectangular shape. In other embodiments, the top load-bearing plate may be of any shape and size that can support the heavy loads to be transported without a risk of the motorized chain roller tilting if a load is not centered on the top load-bearing plate.

The top load-bearing plate 13 may be made of steel or any other material with high strength that does not substantially deform under heavy loads.

As stated, in this embodiment, the top load-bearing plate 13 does not extend all the way between the front plate 19 and the back plate 21. Thus, one or more top cover plates 15 are provided to fully enclose the top opening of the rectangular frame formed by the two side plates 17, the front plate 19 and the back plate 21. The top cover plates 15 abut the top load-bearing plate 13 on opposite sides of the top load-bearing plate 13.

While this embodiment includes two top cover plates 15 of the same shape and size, other embodiments may not have any top cover plates or may have any number of top cover plates of the same or different shape and size.

The tension member 57 is attached to the top load-bearing plate 13 and extends downwardly from the top load-bearing plate 13. In this embodiment, the tension member 57 has an arcuate lower surface that engages the roller chain assembly 5, as discussed below.

II. The Load-Bearing Member

Figure 5:
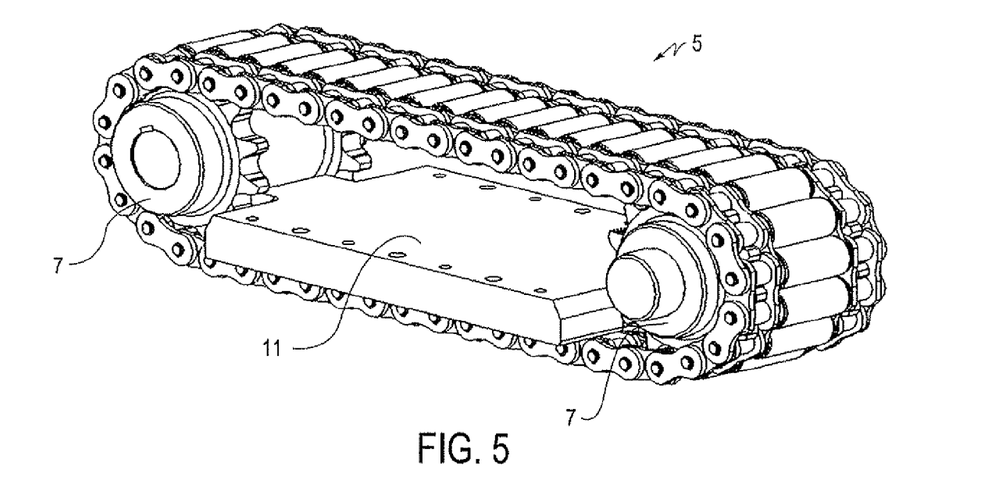
FIG. 5 is a perspective view of the roller chain assembly, the sprocket assemblies and the load-bearing member of the motorized chain roller illustrated in FIGS. 1-4.
Figure 6:
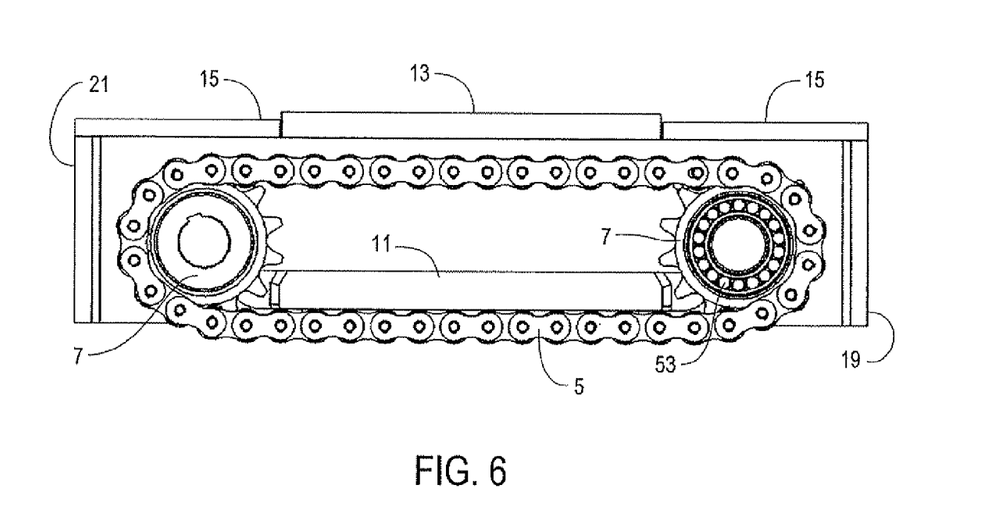
FIG. 6 is a side view of the motorized chain roller illustrated in FIGS. 1-5 with selected components removed for clarity.

The load-bearing member 11 is illustrated in FIGS. 5-7. In this embodiment, the load-bearing member 11 is a substantially rectangular plate that extends between and is attached to the sidewalls 17. Specifically, the side edges of the load-bearing member 11 are received in the indentations 28 of the side walls 17. Those side edges of the load-bearing member 11 are coupled to the side walls 17 as illustrated in FIG. 7 and as explained below. Bars 59 with apertures are placed on the underside of the edges of the load-bearing member 11. Fastening members 59a extend upward through those apertures, through holes in the side edges of the load-bearing member 11, into and through holes in the side walls 17. Fastening members 59a may be screws, bolts, pins, a combination thereof, or any other suitable fasteners.

While in this embodiment, the load-bearing member 11 is a substantially rectangular plate, in other embodiments, the load-bearing member can have any shape and may be a structural member other than a plate. Further, in yet other embodiments, the load-bearing member can comprise multiple components joined and/or acting together to perform the load-bearing function described herein.

III. The Motor Stacks

Figure 1:
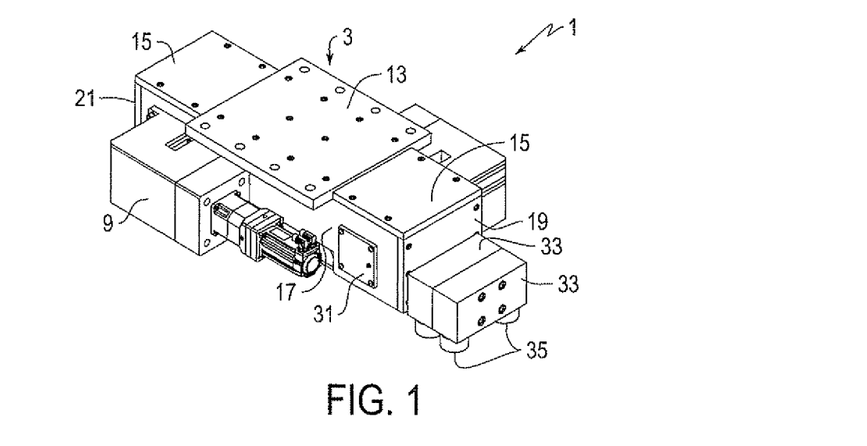
FIG. 1 is a perspective view of a motorized chain roller of one embodiment of this invention.
Figure 2:
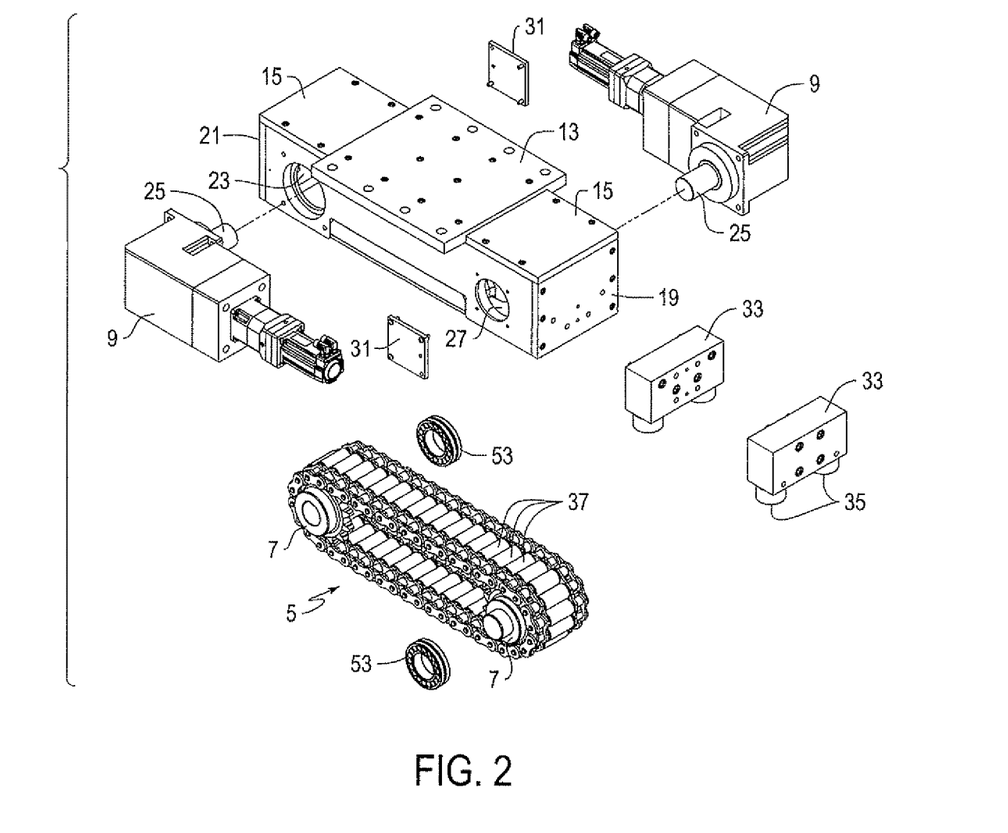
FIG. 2 is an exploded view of the motorized chain roller illustrated in FIG. 1.
Figure 3:
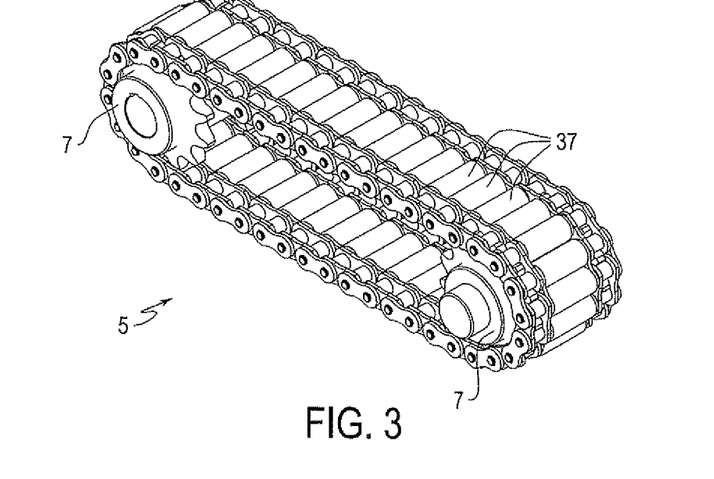
FIG. 3 is a perspective view of the roller chain assembly and the sprocket assemblies of the motorized chain roller illustrated in FIGS. 1 and 2.
Figure 4:
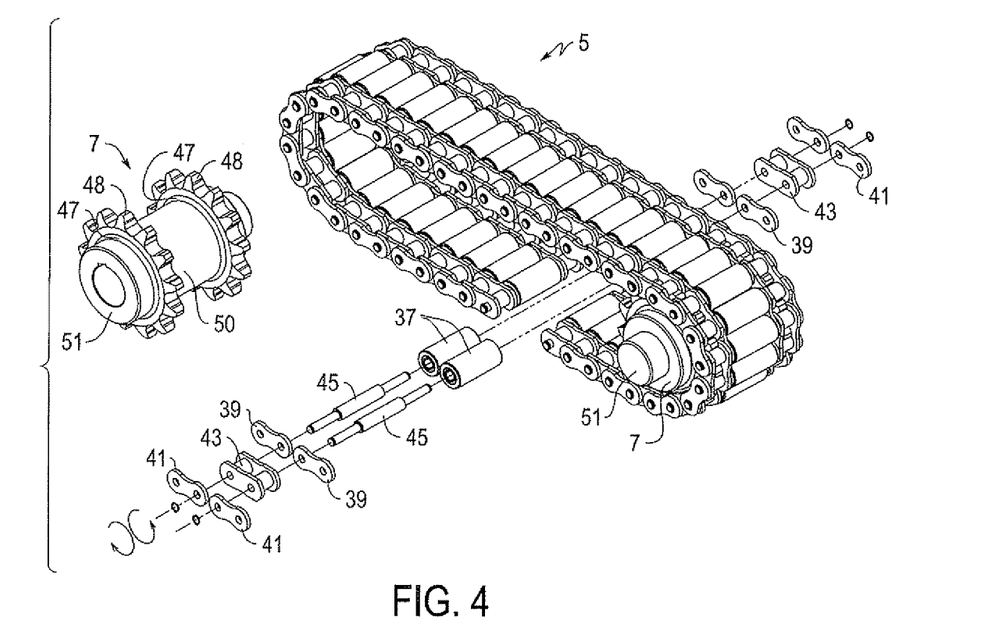
FIG. 4 is a partially exploded view of the roller chain assembly and the sprocket assemblies illustrated in FIG. 3.

Motor stacks 9 are illustrated in FIGS. 1 and 2. Motor stacks 9 include a motor, a brake, a gear head or series of gear heads, and a drive shaft 25. The drive shaft 25 is rotated by the motor via the gear head or series of gear heads. The motors may be hydraulic motors, electric motors, or any other type of motor that is capable of providing the requisite torque.

Motor stacks 9 are attached to side walls 17 of the frame 3. In this embodiment, a motor stack 9 is attached to each side wall 17, at opposite ends of the MCR 1. Other embodiments of this invention may include a single motor stack, or more than two motor stacks. In yet other embodiments, the motor stacks can be attached to the same side wall of the frame, such as in the embodiment illustrated in FIGS. 8 and 9 and described below.

The drive shaft 25 extends inward through the aperture 23 in the side wall 17 to which the motor stack 9 is attached. The drive shafts 25 engage the sprocket assemblies 7 to rotate the sprockets of those assemblies with the necessary torque, as discussed below.

IV. The Sprocket Assemblies

The sprocket assemblies 7 are illustrated in FIGS. 2-6. In this embodiment, there are two sprocket assemblies 7, with each sprocket assembly 7 being driven by the motor of a motor stack 9. In other embodiments, only one of the sprocket assemblies may be driven by a motor and the other sprocket assembly may include an idler sprocket. Further, while in this embodiment, the sprocket assemblies 7 are located at the ends of the loop formed by the roller chain assembly 5 with the load-bearing member 11 located between the sprocket multiple load-bearing members located on opposite sides of the intermediate driven sprocket assembly.

Further, in this embodiment, each sprocket assembly 7 includes a cylindrical member 50, a drive shaft socket 51, two teethed rings 47, and a bearing ring 53. The cylindrical member 50, the drive shaft socket 51, and the teethed rings 47 are an integral member. In other embodiments, the cylindrical member 50, the drive shaft socket 51 and/or the teethed rings 47 can be separate members attached together.

The drive shaft socket 51 receives and engages the drive shaft 25 of motor stack 9, such that the drive shaft socket 51, and thus the cylindrical member 50 and the two teethed rings 47 rotate with the drive shaft 25.

The teethed rings 47 include teeth 48 that engage the roller chain assembly 5, to drive the roller chain assembly 5, as discussed below.

The bearing ring 53 is located around the drive shaft socket 51. The bearing ring 53 permits rotational movement of the cylindrical member 50 and the teethed rings 47 relative to the side walls 17 of the frame 3. While in this embodiment, that relative movement is permitted due to the bearing ring 53, other bearing members can be used in other embodiments.

V. The Roller Chain Assembly

The roller chain assembly 5 is illustrated in FIGS. 2-6. In this embodiment, the roller chain assembly 5 includes a series of parallel and interconnected cylindrical roller sleeves 37. More specifically, the roller chain assembly 5 includes a plurality of roller axles 45, of cylindrical roller sleeves 37, of inner links 39, of engaging links 43, and of outer links 41 (see FIG. 4). There is a series of the inner links 39, the engaging links 43 and the outer links 41 on each end of the roller axles 45 and the roller sleeves 37.

A cylindrical roller sleeve 37 is rotatably mounted on each axle 45. Each of the cylindrical roller sleeves 37 has its own axis of rotation (see FIG. 4), with all the axes of rotation being parallel. The cylindrical roller sleeves 37 may rotate in a clock-wise direction or a counter-clockwise direction, depending on the direction of movement of the roller chain assembly 5.

Each inner link 39 and each outer link 41 receives the ends of a pair of adjacent roller axles 45. The same pair of ends of the roller axles 45 that is received in an inner link 39 is also received in an outer link 41. Each engaging link 43 also receives the ends of a pair of adjacent roller axles 45; however, the pair of adjacent roller axles 45 whose inner link 39 is also received in an outer link 41. Each engaging link 43 also receives the ends of a pair of adjacent roller axles 45; however, the pair of adjacent roller axles 45 whose ends are received in an engaging link 43 is not the same as any pair of roller axles 45 whose ends are received in an inner link 39 and an outer link 41. Rather, the pair of roller axles 45 whose ends are received in an engaging link 43 includes a roller axle 45 whose end is received by one inner link 39 and one outer link 41 and a roller axle 45 whose end is received by an adjacent inner link 39 and outer link 41. As a result, the roller sleeves 37 are interconnected through the axles 45, the inner links 39, the engaging links 43, and the outer links 41.

As illustrated in the Figures, the series of engaging links 43 are located between the series of the inner links 39 and the series of the outer links 41. The teeth 48 of the teethed rings 47 of the sprocket assemblies 7 engage the engaging links 43, as discussed below.

While in this embodiment, the roller axles 45 are connected by "chains" consisting of the inner links 39, the engaging links 43 and the outer links 41, in other embodiments, the roller axles can be connected by any link assembly that permits movement of the roller chain assembly 5 in the loop around the sprocket assemblies. Moreover, while this embodiment has two "chains," a single "chain" may suffice.

VI. The Guide Block Assemblies

This embodiment includes two guide block assemblies 33 that are coupled to the front plate 19 of the frame 3. See FIGS. 1 and 2. The guide block assemblies 33 include guide stops 35 that extend downwardly in a spaced relationship. Each guide block assembly 33 includes a pair of guide stops 35. In this embodiment, guide stops 35 are cam followers, which include a mechanical bearing. In other embodiments, the guide stops can be other mechanical work pieces, including work pieces that include a bearing function.

Guide stops 35 guide MCR 1 along a track (not shown) that may resemble the shape and configuration of a single train track. When used in that manner, the MCR 1 is positioned relative to the rail such that one of each pair of guide stops 35 is on each side of the rail. When the MCR 1 translates, the guide stops 35 keep the MCR 1 properly positioned vis-à-vis the rail.

While in this embodiment there are two guide block assemblies 33 attached to the front wall 19, in other embodiments, such as the embodiment illustrated in FIGS. 8 and 9 (discussed below), there may be one or more guide block assemblies attached to the front wall and the back wall of the motorized chain rollers. Additionally, guide stops may protrude downward from other components of the frame or from guide block assemblies attached to other components of the frame, such as the sidewalls.

VII. Assembly and Operation

The MCR 1 is assembled as follows. The frame 3 is assembled as discussed above. The load-bearing member 11 is attached to the side walls 17 of the frame 3 by plates 59 and fastening members 59a, as also discussed above (see FIG. 7). As further discussed above, the motor stacks 9 are attached to the exteriors of the side walls 17 such that the drive shafts 25 of the motor stacks 9 extend through the apertures 23 in side walls 17 into the interior of the frame 3. The drive shaft sprockets 51 of the sprocket assemblies 7 are attached to the drive shafts 25, such that those sprockets 51 and the cylindrical members 50, teethed rings 47 and brake sockets 52 are driven by the drive shaft 25. The roller chain assembly 5 forms a loop around the sprocket assemblies 7 and the load-bearing member 11. The engaging links 43 of the roller chain assembly 5 are engaged with the teeth 48 of the teethed rings 47 of the sprocket assemblies 7.

The MCR 1 operates as follows.

When the motors of motor stack 9 are activated, the drive shafts 25 rotate. The rotation of the drive shafts 25 causes rotation of the cylindrical members 50 and the teethed rings 47 of the sprocket assemblies 7 due to the drive shaft 25/drive shaft sprocket 51 engagement. Because the teeth 48 of the teethed rings 47 engage the engaging links 43 of the roller chain assembly 5, the rotation of the cylindrical member 50 and the teethed rings 47 causes the roller chain assembly 5 to move in its loop around the sprocket assemblies 7 and the load-bearing member 11.

The cylindrical roller sleeves 37 engage the underside of the load-bearing member 11. That engagement causes propulsion of the MCR 1 or of objects being conveyed by the MCR 1, depending on the mode in which the MCR 1 is being used (the two modes are discussed below), as the roller chain assembly 5 is driven in its loop.

The MCR 1 has two modes of operation.

The first mode of operation is in the orientation illustrated in the Figures. The chain roller assembly 5 is in contact with the ground, pavement or building floor and the object(s) to be transported are on top of the top load-bearing plate 13. Activation of the motors of motor stacks 9 causes movement of the roller chain assembly 5 in its loop around the sprocket assemblies 7 and the load-bearing member 11, as discussed above. Because the cylindrical roller sleeves 37 in the lower portion of the loop formed by the roller chain assembly 5 are "pinched" between (or in engagement with) the load-bearing member 11 and the ground, pavement or floor of a building, movement of the roller chain assembly 5 in its loop causes translation of the MCR 1 along the ground, pavement or floor of a building. More specifically, the cylindrical roller sleeves 37 in the lower portion of the loop are in engagement with both the load-bearing member 11 and the ground, pavement or building floor. Movement of those roller sleeves 37 in the loop causes those roller sleeves 37, and thus the entire MCR 1, to move laterally, because the individual roller sleeves 37 "roll" along the ground, pavement or building floor.

The motors of motor stacks 9 are reversible, such that MCR 1 can go forward or backward.

In the second mode of operation, the MCR 1 is inverted from the orientation illustrated in the Figures such that the top load-bearing plate 13 of the frame 3 rests on the ground, pavement or floor surface and the underside of the roller chain assembly 5 is facing upward. In this orientation, the MCR 1 functions as a load conveyor, because the MCR 1 does not move.

In this second mode of operation, the object(s) to be conveyed are placed on top of the exposed portion of the roller chain assembly 5. When the motors of motor stacks 9 are activated, the cylindrical members 50 and the teethed rings 47 are still rotated by the drive shafts 25 of the motor stacks 9. That again causes the roller chain assembly 5 to move in its loop around the sprocket assemblies 7 and the load-bearing member 11. Because the roller chain assembly 5 is in firm engagement with the load-bearing member 11 and the underside of the object(s) being conveyed, movement of the roller chain assembly 5 in the loop causes the objects being conveyed to move laterally with the roller chain assembly 5.

Multiple MCRs 1 may be aligned such that an object or objects may be transported on top of the cylindrical roller sleeves 37 of multiple roller chain assemblies 5.

The interplay of the load-bearing member 11 and the roller sleeves 37 in contact with the load-bearing member 11 causes the force from the load being transported to be evenly distributed on the load-bearing member 11, the frame 3 and the roller chain assembly 5. That is advantageous because heavier loads may be transported with the same amount of lateral force as compared to conventional moving mechanisms that do not equally distribute the weight force of the loads.

Regardless of the orientation of MCR 1, the tension member 57 applies a tension force to the roller chain assembly 5 to prevent slack in the roller chain assembly 5 and ensure that the roller chain assembly 5 efficiently transmits force from the sprocket assemblies 7 into lateral movement.

Figure 8:
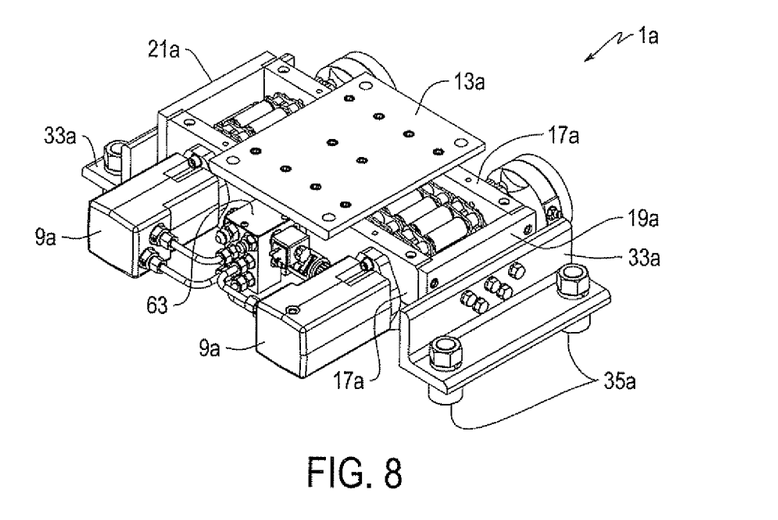
FIG. 8 is a perspective view of a motorized chain roller of a second embodiment of this invention with selected components removed for clarity.
Figure 9:
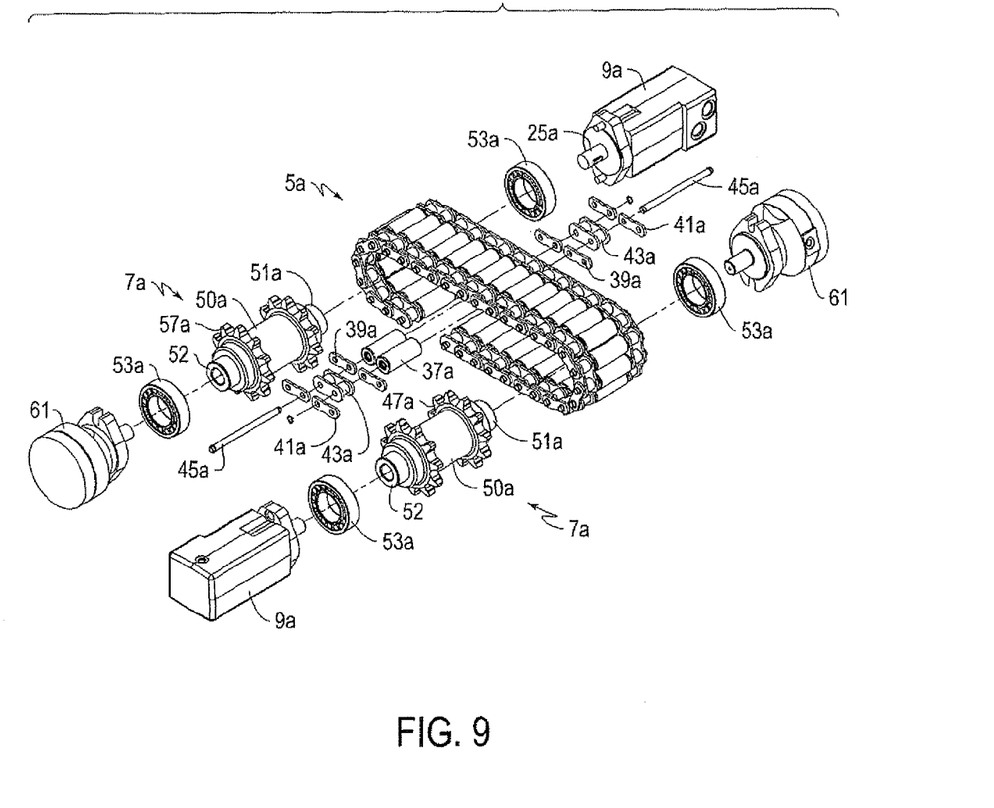
FIG. 9 is a partially exploded view of the roller chain assembly, the sprocket assemblies and the motors of the motorized chain roller illustrated in FIG. 8.

A second embodiment of the invention is illustrated in FIGS. 8 and 9—MCR 1a. The components of the MCR 1a are given the same reference numbers as the corresponding components of the MCR 1, except that a suffix "a" is added.

In this embodiment, the motor stacks 9a include direct motors. That is, the drive shaft 25a is directly driven by the motor, without any intervening gears. This embodiment also includes brakes that are external to the motor stacks 9a, brakes 61. Also in this embodiment, the sprocket assemblies 7a include brake socket 52. The brakes 61 engage the brake sockets 52. Each brake 61 is operated by a brake solenoid 63. The brakes 61 may be drum brakes, disc brakes, or any other type of brakes that retards rotation of the cylindrical members 50a and the teethed rings 47a.

Also, in this embodiment, motor stacks 9a are attached to the same side wall 17a. Moreover, guide block assemblies 33 are replaced by guide flanges 33a, with a guide flange 33a being attached to each of the front wall 19a and the back wall 21a. The guide stops 35a extend downward from the guide flanges 33a in a spaced relationship, such that a track can be received between each pair of the guide stops 35a.

Due to the arrangement of the frames, motors, sprocket assemblies, load-bearing members and chain roller assemblies of the embodiments illustrated in the Figures, the height of the illustrated motorized chain rollers can be less that 20 inches and preferably as low as approximately 13 inches, but may be even lower.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A motorized chain roller comprising:
   a frame;
   a roller chain assembly movably disposed within the frame, the roller chain assembly including a plurality of interconnected cylindrical rolls arranged in a continuous series, each of the cylindrical rolls having an axis of rotation;
   a first sprocket that engages the roller chain assembly to apply a transmission force to the roller chain assembly;
   at least one motor coupled to the frame and configured to transmit a rotational force on the first sprocket; and
   a load-bearing member coupled to and located within the frame,
   wherein the roller chain assembly is configured such that the rolls engage the load-bearing member to cause movement between the roller chain assembly and the load-bearing member perpendicular to the axes of rotation.

2. The motorized chain roller of claim 1, wherein the load-bearing member is a plate and the rolls engage one surface of the plate.

3. The motorized chain roller of claim 1:
further comprising a second sprocket spaced from the first sprocket;
wherein the roller chain assembly forms a loop around the first and second sprockets; and
wherein the load-bearing member is located within the loop, between the first and second sprockets.

4. The motorized chain roller assembly according to claim 3 wherein the second sprocket is driven by a second motor.

5. The motorized chain roller of claim 1, wherein three or more of the rollers are in contact with the load-bearing member.

6. The motorized chain roller of claim 1, wherein the roller chain assembly further includes a plurality of overlapping links that connect adjacent rolls of the plurality of rolls.

7. The motorized chain roller of claim 6, wherein the overlapping links include a first set of links that extend between first pairs of the adjacent rolls and a second set of links that extend between second pairs of the adjacent rolls, and wherein none of the first pairs are the same as any of the second pairs.

8. The motorized chain roller of claim 7, herein the first sprocket engages the second set of links to apply the transmission force to the roller chain assembly.

9. The motorized chain roller of claim 8, wherein:
the first sprocket has two sets of spaced teeth,
there is one of the first set and one of the second set of links at each end of each of the plurality of rolls; and
one of the sets of teeth engages one of the second set of links.

10. The motorized chain roller of claim 1, wherein:
the axes of rotation are in parallel;
each of the rollers includes an axle and a sleeve rotatably encompassing the axle; and
the axles are connected by first and second sets of overlapping links.

11. The motorized chain roller of claim 10, wherein:
the first set of links extend between first pairs of the axles and the second set of links extend between second pairs of the axles;
none of the second pairs are the same as the first pairs; and
the sprocket engages the second set of links.

12. The motorized chain roller of claim 1, wherein the cylindrical rolls of the roller chain assembly are configured to simultaneously contact a floor surface and a bottom surface of the load-bearing member and propel the motorized chain roller when the transmission force is applied to the roller chain assembly.

13. The motorized chain roller of claim 1, further comprising at least one guide block coupled to the frame and having guide stops that are configured to engage a raised track.

14. A motorized chain roller comprising:
a frame;
a roller chain assembly movably disposed within the frame, the roller chain assembly including a plurality of interconnected cylindrical rolls arranged in a continuous series, each of the cylindrical rolls having an axis of rotation;
a first sprocket that engages the roller chain assembly to apply a transmission force to the roller chain assembly;
at least one motor coupled to the frame and configured to transmit a rotational force on the first sprocket; and
a load-bearing member coupled to and located within the frame,
wherein the roller chain assembly is configured such that the rolls engage the load-bearing member and a surface upon which the motorized chain roller is disposed to cause the frame to move across the surface in a direction perpendicular to the axes of rotation.

15. A motorized chain roller comprising:
a frame;
a motor attached to the frame and having a drive shaft;
a first sprocket connected to the drive shaft such that it is rotated by the drive shaft;
a second sprocket spaced from the first sprocket;
a roller chain assembly including a plurality of interconnected cylindrical rolls arranged in a continuous series, each of the cylindrical rolls having an axis of rotation, the roller chain assembly extending between and engaging the first and second sprockets; and
a load-bearing member coupled to the frame,
wherein the rolls of the roller chain assembly engage the load-bearing member to cause lateral movement between the roller chain assembly and the load-bearing member.

16. The motorized chain roller of claim 15, wherein the load-bearing member is a plate and the rolls engage one surface of the plate.

17. The motorized chain roller of claim 16, wherein:
the roller chain assembly forms a loop around the first and second sprockets, and
the load-bearing member is located in the loop, between the first and second sprockets.

18. The motorized chain roller of claim 15, wherein the roller chain assembly further includes a plurality of overlapping links that connect adjacent rolls of the plurality of rolls.

19. The motorized chain roller of claim 18, wherein the overlapping links include a first set of links that extend between first pairs of the adjacent rolls and a second set of links that extend between second pairs of the adjacent rolls, and wherein none of the first pairs are the same as any of the second pairs.

20. The motorized chain roller of claim 19, wherein the first sprocket engages the second set of links to apply a transmission force to the roller chain assembly.

* * * * *